United States Patent
Hamada

(10) Patent No.: US 11,294,633 B2
(45) Date of Patent: Apr. 5, 2022

(54) SECURE COMPUTATION SYSTEM, SECURE COMPUTATION DEVICE, SECURE COMPUTATION METHOD, AND PROGRAM

(71) Applicant: NIPPON TELEGRAPH AND TELEPHONE CORPORATION, Chiyoda-ku (JP)

(72) Inventor: Koki Hamada, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 301 days.

(21) Appl. No.: 16/466,887

(22) PCT Filed: Jan. 18, 2018

(86) PCT No.: PCT/JP2018/001346
§ 371 (c)(1),
(2) Date: Jun. 5, 2019

(87) PCT Pub. No.: WO2018/135566
PCT Pub. Date: Jul. 26, 2018

(65) Prior Publication Data
US 2019/0310829 A1    Oct. 10, 2019

(30) Foreign Application Priority Data
Jan. 20, 2017 (JP) .............................. JP2017-008094

(51) Int. Cl.
*G06F 7/552* (2006.01)
*G09C 1/00* (2006.01)

(52) U.S. Cl.
CPC ............... *G06F 7/552* (2013.01); *G09C 1/00* (2013.01)

(58) Field of Classification Search
CPC .......... G06F 7/552; G06F 21/71; G06F 21/72; H04L 9/085; H04L 2209/46; G09C 1/00; H04K 1/00; H04K 1/02
See application file for complete search history.

(56) References Cited

U.S. PATENT DOCUMENTS

| | | | |
|---|---|---|---|
| 2011/0176677 A1* | 7/2011 | Furukawa | H04L 9/3218 380/255 |
| 2016/0149866 A1* | 5/2016 | Dolev | H04L 51/32 726/30 |
| 2017/0222798 A1* | 8/2017 | Morel | H04L 9/30 |

OTHER PUBLICATIONS

S. Garg, et al, Lectures 1&2: Introduction to Secure Computation, Yao's and GMW Protocols, CS 294—Secure Computation., https://people.eecs.berkeley.edu/~sanjamg/classes/cs294-spring16/scribes/1.pdf, 2016 (Year: 2016).*

(Continued)

*Primary Examiner* — Emily E Larocque
(74) *Attorney, Agent, or Firm* — Oblon, McClelland, Maier & Neustadt, L.L.P.

(57) ABSTRACT

A secure computation system calculates concealed text of a difference x−r from concealed text by using concealed text and generates concealed text and of an integer portion e and a decimal fraction portion f (0≤f<1) of the difference x−r from the concealed text; reconstructs the decimal fraction portion f from the concealed text; generates, from the decimal fraction portion f and the concealed text, concealed text of a left shift value y obtained by shifting $2^f$, which is 2 raised to the power f which is the decimal fraction portion f, to the left by e bit; and calculates, as concealed text, concealed text of a value $2^r xy$ obtained by multiplying $2^r$, which is a power of 2, by the left shift value y from the concealed text by using the concealed text.

4 Claims, 2 Drawing Sheets

(56) References Cited

OTHER PUBLICATIONS

International Search Report dated Feb. 13, 2018 in PCT/JP2018/001346 filed on Jan. 18, 2018.
Hamada, K., "Secure multi-party algorithms for evaluating some elementary functions with efficient on-line complexity," The Institute of Electronics, Information and Communication Engineers, SCIS 2017, Total 7 pages (with English abstract).
Chida, K. et al., "A Three-Party Secure Function Evaluation with Lightweight Verifiability Revisited," Information Processing Society of Japan Symposium Series, vol. 2010, No. 9, 2010, pp. 555-560 (with English abstract).
Damgard, I. et al., "Multiparty Computation from Somewhat Homomorphic Encryption," CRYPTO 2012, LNCS 7417, 2012, pp. 643-662.
Kamm, L. et al., "Secure floating point arithmetic and private satellite collision analysis," International Journal of Information Security, vol. 14, No. 6, 2015, pp. 531-548.
Catrina, O. et al., "Secure Computation with Fixed-Point Numbers," Financial Cryptography 2010, LNCS 6052, 2010, pp. 35-50.
Aliasgari, M. et al., "Secure Computation on Floating Point Numbers," NDSS 2013, 2013, pp. 1-31.

\* cited by examiner

| SECURE COMPUTATION ALGORITHM (FIRST EMBODIMENT) |
|---|
| Input: $[[x]], [[r]], [[2^r]]$ <br> Output: $[[2^x]]$ <br> 1: $[[e]], [[f]] \leftarrow \text{Split}([[x]]-[[r]])$ <br> 2: $f \leftarrow \text{Open}([[f]])$ <br> 3: $[[y]] \leftarrow 2^f << [[e]]$ <br> 4: $[[2^x]] \leftarrow [[2^r]] \times [[y]]$ |

10 SECURE COMPUTATION SYSTEM

SECURE COMPUTATION SYSTEM, SECURE COMPUTATION DEVICE, SECURE COMPUTATION METHOD, AND PROGRAM

TECHNICAL FIELD

The present invention relates to secure computation techniques and, in particular, relates to a secure computation technique of calculating a power of 2 with an input value kept secret.

BACKGROUND ART

As a method of obtaining the computation result of a designated computation without reconstructing the encrypted numerical values, there is a method called secure computation (see, for example, Non-patent Literature 1). With the method of Non-patent Literature 1, it is possible to perform encryption by which a plurality of pieces of information (shares of a numerical value), whose numerical values can be reconstructed, are distributed over three secure computation devices and make the three secure computation devices hold the results of addition and subtraction, constant addition, multiplication, constant multiplication, logical operations (a NOT, an AND, an OR, and an XOR), and data format conversion (an integer or a binary) with the results being distributed over these secure computation devices, that is, in an encrypted state, without reconstructing the numerical values. In general, the number of secure computation devices over which the information is distributed is not limited to 3 and can be set at W (W is a predetermined constant greater than or equal to 2), and a protocol that implements secure computation by cooperative computations by W secure computation devices is called a multi-party protocol.

It is to be noted that a secure computation method which is performed when the number of secure computation devices over which the information is distributed is 2 is disclosed in Non-patent Literature 2, for example.

As a method that implements calculation of an exponential function by secure computation, there is a method of Non-patent Literature 3. In the method of Non-patent Literature 3, calculation of an exponential function is implemented by first decomposing a value, which is the power to which 2 is to be raised, into an integer portion e and a decimal fraction portion f ($0 \le f < 1$) and then calculating $2^e$ and $2^f$, which are 2 raised to the power e and 2 raised to the power f, and obtaining the product of $2^e$ and $2^f$.

PRIOR ART LITERATURE

Non-Patent Literature

Non-patent Literature 1: Koji Chida, Koki Hamada, Dai Ikarashi, Katsumi Takahashi, "A Three-party Secure Function Evaluation with Lightweight Verifiability Revisited", Information Processing Society of Japan Symposium Series, Vol. 2010, No. 9, pp. 555-560, 2010.
Non-patent Literature 2: Ivan Damgard, Valerio Pastro, Nigel Smart, Sarah Zakarias, "Multiparty Computation from Somewhat Homomorphic Encryption", CRYPTO 2012, LNCS7417, pp. 643-662, 2012.
Non-patent Literature 3: Liina Kamm, Jan Willemson, "Secure floating point arithmetic and private satellite collision analysis", International Journal of Information Security, Vol. 14, No. 6, pp. 531-548, 2015.

SUMMARY OF THE INVENTION

Problems to be Solved by the Invention

However, in the method of Non-patent Literature 3, when $2^f$, which is 2 raised to the power f which is the decimal fraction portion f, is calculated, calculation of a fourth-order polynomial in f has to be performed, which makes a calculation time undesirably long.

Therefore, an object of the present invention is to provide a secure computation technique of calculating a power of 2 in a shorter calculation time.

Means to Solve the Problems

An aspect of the present invention is a secure computation system in which r is assumed to be a random number which satisfies $0 \le r < 1$, is assumed to be concealed text of the random number r, and is assumed to be concealed text of $2^r$, which is 2 raised to the power r, the secure computation system which is configured with two or more secure computation devices and calculates, from concealed text of a value x which is the power to which 2 is raised, concealed text of $2^x$, which is 2 raised to the power x which is the value x. The secure computation system includes: a decimal fraction decomposing means that calculates concealed text of a difference x−r between the value x and the random number r from the concealed text by using the concealed text and generates concealed text and of an integer portion e and a decimal fraction portion f ($0 \le f < 1$) of the difference x−r from the concealed text; a reconstructing means that reconstructs the decimal fraction portion f from the concealed text; a left shift means that generates, from the decimal fraction portion f and the concealed text, concealed text of a left shift value y which is a value obtained by shifting $2^f$, which is 2 raised to the power f which is the decimal fraction portion f, to the left by e bit; and a power calculating means that calculates, as the concealed text, concealed text of a value $2^r xy$ obtained by multiplying the $2^r$, which is a power of 2, by the left shift value y from the concealed text by using the concealed text.

Effects of the Invention

According to the present invention, since it is possible to perform calculation of a power of 2 without performing calculation of a polynomial, it is possible to reduce the calculation time necessary for secure computation of a power of 2.

DETAILED DESCRIPTION OF THE EMBODIMENTS

Figures 1, 2:
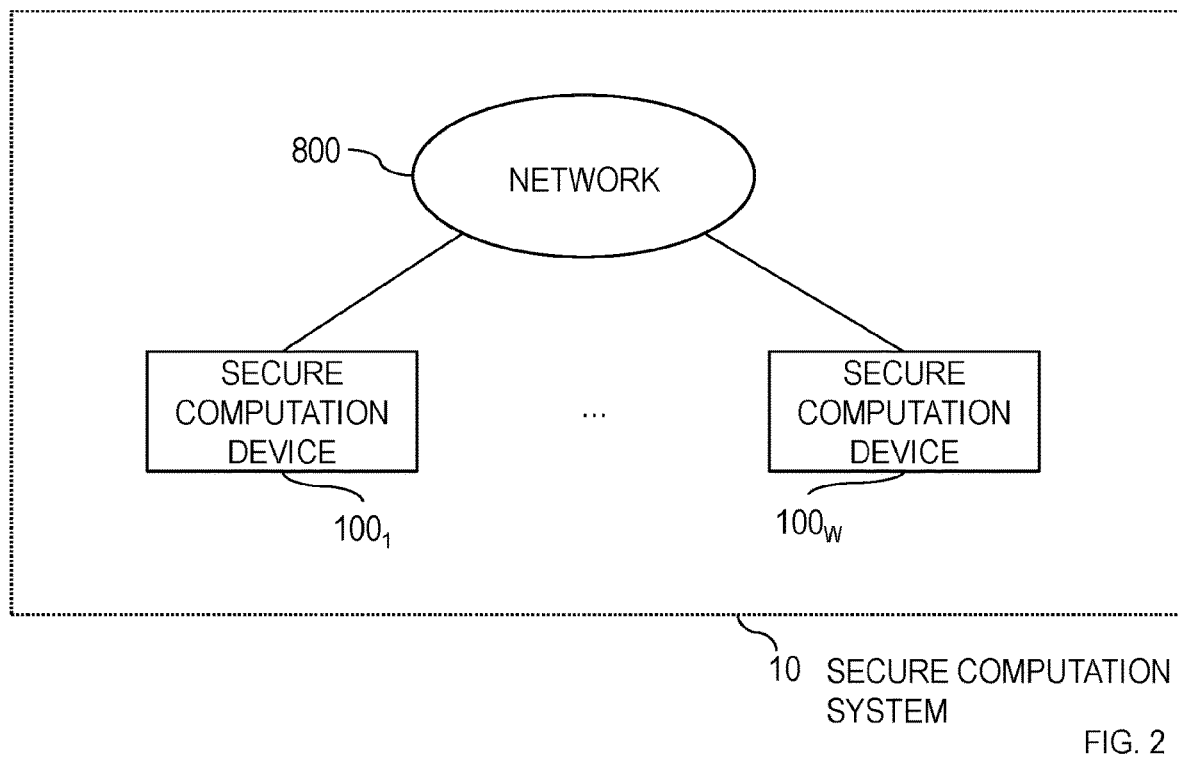
FIG. 1 is a diagram depicting procedures of a secure computation algorithm of a first embodiment.
FIG. 2 is a block diagram depicting the configuration of a secure computation system 10.

Hereinafter, an embodiment of the present invention will be described in detail. It is to be noted that constituent units having the same function will be identified with the same reference character and overlapping explanations will be omitted.

A secure computation algorithm for a power of 2, which will be described later, is constructed by combining computations on the existing secure computation. Computations required by this secure computation algorithm are concealment and reconstruction, addition, subtraction, multiplication, decimal fraction decomposition, and left shift. First, definitions, notation, and the like of each computation will be described.

Definitions, Notation, Etc.

[Concealment and Reconstruction]

It is assumed that a value obtained by concealing a value a by encryption, secret sharing, or the like is referred to as concealed text of a and expressed as. It is assumed that, when the concealed text of a is generated by secret sharing, a set of shares of secret sharing, which the secure computation devices hold, is referred to based on.

Moreover, it is assumed that processing by which a is obtained by reconstructing the concealed text of a is expressed as a→Open.

As a method of concealment and reconstruction, specifically, there is a technique of Reference Non-patent Literature 1 or 2.

(Reference Non-patent Literature 1) Octavian Catrina, Amitabh Saxena, "Secure Computation with Fixed-Point Numbers", Financial Cryptography 2010, LNCS6052, pp. 35-50, 2010.

(Reference Non-patent Literature 2) Mehrdad Aliasgari, Marina Blanton, Yihua Zhang, Aaron Steele, "Secure Computation on Floating Point Numbers", NDSS 2013, 2013.

In Reference Non-patent Literature 1, fixed-point or integer operations are disclosed. Moreover, in Reference Non-patent Literature 2, floating-point operations are disclosed.

[Addition, Subtraction, Multiplication]

Addition, subtraction, and multiplication calculate concealed text and of a sum $c_1$, a difference $c_2$, and a product $c_3$, which are the calculation results of a+b, a−b, and ab, respectively, by using concealed text and of two values a and b as input. It is assumed that processing by which is obtained, processing by which is obtained, and processing by which is obtained are respectively expressed as →Add, →Sub, and →Mul. When there is no possibility of misunderstanding, Add, Sub, and Mul are sometimes abbreviated as +, −, and ×, respectively.

As a method of addition, subtraction, and multiplication, specifically, there is the technique of Reference Non-patent Literature 1 or 2. In Reference Non-patent Literature 1, fixed-point or integer operations are disclosed. Moreover, in Reference Non-patent Literature 2, floating-point operations are disclosed.

[Decimal Fraction Decomposition]

It is assumed that processing by which, for concealed text of a, concealed text and of an integer portion e and a decimal fraction portion f ($0 \le f < 1$) of a is calculated is expressed as →Split.

As a method of decimal fraction decomposition, specifically, there is a technique of Non-patent Literature 3. In Non-patent Literature 3, floating-point operations are disclosed. Moreover, as for fixed-point or integer operations, it is only necessary to combine interconversion between a fixed-point number (an integer) and a floating-point number of Reference Non-patent Literature 1 and decimal fraction decomposition of a floating-point number of Non-patent Literature 3.

[Left Shift]

It is assumed that processing by which concealed text of a left shift value c ($=a \times 2^b$), which is a value obtained by shifting a to the left by b bit (that is, a value obtained by multiplying a by $2^b$), is calculated from concealed text of a and concealed text of b is expressed as →<<.

As for floating-point operations, it is only necessary to add a shift amount (y of x<<y) to an exponent part. Moreover, as for fixed-point or integer operations, it is only necessary to combine interconversion between a fixed-point number (an integer) and a floating-point number of Reference Non-patent Literature 1 and the above-described shifting of a floating-point number to the left.

First Embodiment

Hereinafter, input and output and procedures of a secure computation algorithm of a first embodiment and a secure computation system that implements the secure computation algorithm of the first embodiment will be described.

[Input and Output]

Input and output of the secure computation algorithm of the first embodiment shown in FIG. 1 will be described.

Input is concealed text of a value x which is the power to which 2 is raised. Moreover, concealed text and of a random number r, which satisfies $0 \le r < 1$, and $2^r$, which is 2 raised to the power r, is also input.

Output is concealed text of $2^x$, which is 2 raised to the power x.

[Procedures]

The procedures of the secure computation algorithm of the first embodiment depicted in FIG. 1 will be described. In so doing, expressions such as Step 1 and Step 2 are adopted by using the numerals on the left end of FIG. 1.

In Step 1, from the input concealed text and, concealed text of a difference x−r, which is the result of subtraction of the random number r from x, is calculated. Next, concealed text and of an integer portion e and a decimal fraction portion f ($0 \le f < 1$) of the difference x−r is generated from the concealed text. Here, x−r=e+f holds.

In Step 2, the decimal fraction portion f of the difference x−r is reconstructed from the concealed text generated in Step 1.

In Step 3, concealed text of a left shift value y which is a value obtained by shifting $2^f$, which is 2 raised to the power f, to the left by e bit is generated from the decimal fraction portion f reconstructed in Step 2 and the concealed text generated in Step 1. Here, $y = 2^f << e = 2^{f+e} = 2^{x-r}$ holds.

In Step 4, concealed text of the product $2^r xy$, which is the result of multiplication of $2^r$ by y, is calculated from the input concealed text and the concealed text generated in Step 3. Here, $2^r xy = 2^r \times 2^{x-r} = 2^x$ holds.

[Secure Computation System]

Figure 3:
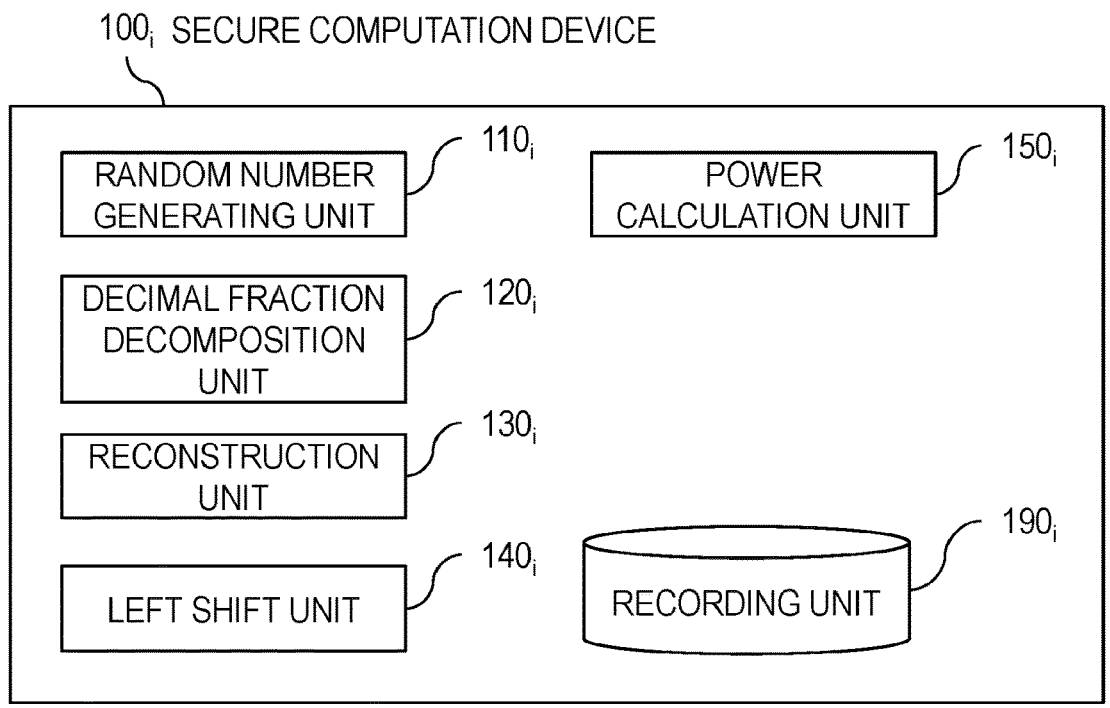
FIG. 3 is a block diagram depicting the configuration of a secure computation device $100_i$.
Figure 4:
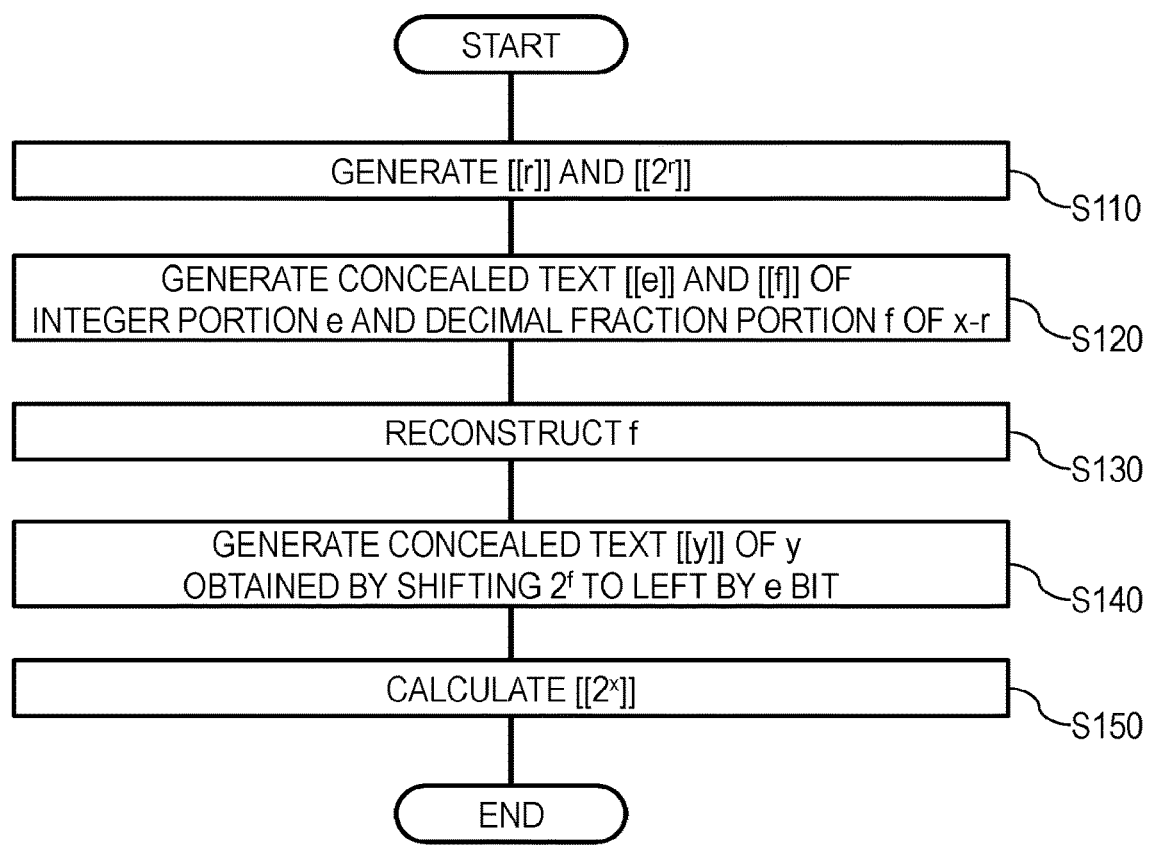
FIG. 4 is a flowchart showing an operation of the secure computation system 10.

Hereinafter, a secure computation system 10 of the first embodiment will be described with reference to FIGS. 2 to 4. FIG. 2 is a block diagram depicting the configuration of the secure computation system 10. The secure computation system 10 includes W (W is a predetermined integer greater than or equal to 2) secure computation devices $100_1, \ldots, 100_W$. The secure computation devices $100_1, \ldots, 100_W$ are connected to a network 800 and can communicate with each other. The network 800 may be, for example, a communications network such as the Internet or a broadcast communication channel. FIG. 3 is a block diagram depicting the configuration of a secure computation device $100_i$ ($1 \le i \le W$). FIG. 4 is a flowchart showing an operation of the secure computation system 10.

As depicted in FIG. 3, the secure computation device $100_i$ includes a random number generating unit $110_i$, a decimal fraction decomposition unit $120_i$, a reconstruction unit $130_i$, a left shift unit $140_i$, a power calculation unit $150_i$, and a recording unit $190_i$. Apart from the recording unit $190_i$, the constituent units of the secure computation device $100_i$ are configured so as to be capable of executing, of computations which are required in the secure computation algorithm, that is, at least concealment, reconstruction, addition, subtraction, multiplication, decimal fraction decomposition, and left shift, computations which are required to implement the functions of the constituent units. In the present invention, as specific functional configurations for implementing individual computations, configurations that can execute the algorithms in, for example, Non-patent Literatures disclosed as Prior Art Literature and Reference Non-patent Literatures disclosed in <Definitions, notation, etc.> serve the purpose, and their detailed explanations will be omitted because they are the existing configurations. Moreover, the recording unit $190_i$ is a constituent unit that records information which is necessary for processing of the secure computation device $100_i$.

By cooperative computations which are performed by the W secure computation devices $100_i$, the secure computation system 10 implements the secure computation algorithm which is a multi-party protocol. Thus, a random number generating means 110 (which is not depicted in the drawing) of the secure computation system 10 is configured with the random number generating units $110_1, \ldots, 110_W$, a decimal fraction decomposing means 120 (which is not depicted in the drawing) is configured with the decimal fraction decomposition units $120_1, \ldots, 120_W$, a reconstructing means 130 (which is not depicted in the drawing) is configured with the reconstruction units $130_1, \ldots, 130_W$, a left shift means 140 (which is not depicted in the drawing) is configured with the left shift units $140_1, \ldots, 140_W$, and a power calculating means 150 (which is not depicted in the drawing) is configured with the power calculation units $150_1, \ldots, 150_W$.

By using concealed text and of the previously generated random number r ($0 \le r < 1$) and $2^r$, which is 2 raised to the power r, the secure computation system 10 calculates, from concealed text of a value (that is, an exponent) x which is the power to which 2 is raised, concealed text of $2^x$, which is 2 raised to the power x. Hereinafter, an operation of the secure computation system 10 will be described in accordance with FIG. 4.

The random number generating means 110 generates a random number r which satisfies $0 \le r < 1$ and generates concealed text and (S110). This corresponds to a preliminary setup of input values of the secure computation algorithm of FIG. 1. The concealed text and is recorded on the recording units $190_1, \ldots, 190_W$.

By using the concealed text generated before input of the concealed text, the decimal fraction decomposing means 120 calculates concealed text of a difference x−r between x and the random number r from the concealed text of x and generates concealed text and of an integer portion e and a decimal fraction portion f ($0 \le f < 1$) of the difference x−r from the concealed text (S120). This corresponds to Step 1 of the secure computation algorithm of FIG. 1.

The reconstructing means 130 reconstructs the decimal fraction portion f from the concealed text generated in S120 (S130). This corresponds to Step 2 of the secure computation algorithm of FIG. 1.

The left shift means 140 generates, from the decimal fraction portion f reconstructed in S130 and the concealed text generated in S120, concealed text=$2^f \ll$ of a left shift value y which is a value obtained by shifting $2^f$, which is 2 raised to the power f which is the decimal fraction portion f, to the left by e bit (S140). This corresponds to Step 3 of the secure computation algorithm of FIG. 1.

By using the concealed text generated before input of the concealed text, the power calculating means 150 calculates, from the concealed text generated in S140, concealed text of the product $2^r \times y$ which is the result of multiplication of $2^r$, which is a power of 2, by the left shift value y (S150). This corresponds to Step 4 of the secure computation algorithm of FIG. 1.

According to the invention of the present embodiment, since calculation of $2^x$ can be implemented by executing one subtraction, one decimal fraction decomposition operation, one reconstruction operation, one left shift operation, and one multiplication, calculation cost is reduced. Moreover, by using the fact that $2^x = 2^{x-r} \times 2^r$ on the assumption that is given, processing by which the output value is calculated from the input value is reduced to calculation of. In general, information leaks when the decimal fraction portion f of the exponent x−r of $2^{x-r}$ is reconstructed; however, by adjusting the decimal fraction portion of the exponent x−r so as to be uniform random values greater than or equal to 0 and smaller than 1 (that is, by extracting a decimal fraction portion after calculating x−r and making only the decimal fraction portion public), it is possible to securely execute calculation of $2^x$.

APPENDIX

Each device according to the present invention has, as a single hardware entity, for example, an input unit to which a keyboard or the like is connectable, an output unit to which a liquid crystal display or the like is connectable, a communication unit to which a communication device (for example, communication cable) capable of communication with the outside of the hardware entity is connectable, a central processing unit (CPU, which may include cache memory and/or registers), RAM or ROM as memories, an external storage device which is a hard disk, and a bus that connects the input unit, the output unit, the communication unit, the CPU, the RAM, the ROM, and the external storage device so that data can be exchanged between them. The hardware entity may also include, for example, a device (drive) capable of reading and writing a recording medium such as a CD-ROM as desired. A physical entity having such hardware resources may be a general-purpose computer, for example.

The external storage device of the hardware entity has stored therein programs necessary for embodying the aforementioned functions and data necessary in the processing of the programs (in addition to the external storage device, the programs may be prestored in ROM as a storage device exclusively for reading out, for example). Also, data or the like resulting from the processing of these programs are stored in the RAM and the external storage device as appropriate.

In the hardware entity, the programs and data necessary for processing of the programs stored in the external storage device (or ROM and the like) are read into memory as necessary to be interpreted and executed/processed as appropriate by the CPU. As a consequence, the CPU embodies predetermined functions (the components represented above as units, means, or the like).

The present invention is not limited to the above embodiment, but modifications may be made within the scope of the present invention. Also, the processes described in the embodiment may be executed not only in a chronological sequence in accordance with the order of their description but may be executed in parallel or separately according to the processing capability of the device executing the processing or any necessity.

As already mentioned, when the processing functions of the hardware entities described in the embodiment (the devices of the present invention) are to be embodied with a computer, the processing details of the functions to be provided by the hardware entities are described by a program. By the program then being executed on the computer, the processing functions of the hardware entity are embodied on the computer.

The program describing the processing details can be recorded on a computer-readable recording medium. The computer-readable recording medium may be any kind, such as a magnetic recording device, an optical disk, a magneto-optical recording medium, or a semiconductor memory. More specifically, a magnetic recording device may be a hard disk device, flexible disk, or magnetic tape; an optical disk may be a DVD (digital versatile disc), a DVD-RAM (random access memory), a CD-ROM (compact disc read only memory), or a CD-R (recordable)/RW (rewritable); a magneto-optical recording medium may be an MO (magneto-optical disc); and a semiconductor memory may be EEP-ROM (electronically erasable and programmable-read only memory), for example.

Also, the distribution of this program is performed by, for example, selling, transferring, or lending a portable recording medium such as a DVD or a CD-ROM on which the program is recorded. Furthermore, a configuration may be adopted in which this program is distributed by storing the program in a storage device of a server computer and transferring the program to other computers from the server computer via a network.

The computer that executes such a program first, for example, temporarily stores the program recorded on the portable recording medium or the program transferred from the server computer in a storage device thereof. At the time of execution of processing, the computer then reads the program stored in the storage device thereof and executes the processing in accordance with the read program. Also, as another form of execution of this program, the computer may read the program directly from the portable recording medium and execute the processing in accordance with the program and, furthermore, every time the program is transferred to the computer from the server computer, the computer may sequentially execute the processing in accordance with the received program. Also, a configuration may be adopted in which the transfer of a program to the computer from the server computer is not performed and the above-described processing is executed by so-called application service provider (ASP)-type service by which the processing functions are implemented only by an instruction for execution thereof and result acquisition. Note that a program in this form shall encompass information that is used in processing by an electronic computer and acts like a program (such as data that is not a direct command to a computer but has properties prescribing computer processing).

Further, although the hardware entity was described as being configured via execution of a predetermined program on a computer in this form, at least some of these processing details may instead be embodied with hardware.

The foregoing description of the embodiment of the invention has been presented for the purpose of illustration and description. It is not intended to be exhaustive and to limit the invention to the precise form disclosed. Modifications or variations are possible in light of the above teaching. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A secure computation system in which r is a random number which satisfies $0<r<1$, is concealed text of the random number r, and is concealed text of $2^r$, which is 2 raised to a power r, the secure computation system which comprises two or more secure computation devices and calculates, from concealed text of a value x which is a power to which 2 is raised, concealed text of $2^x$, which is 2 raised to the power x, the secure computation system comprising:
   the two or more secure computation devices which each have processing circuitry and are configured to cooperatively:
      receive, over a network, an input of the concealed text;
      calculate concealed text of a difference x−r between the value x and the random number r from the concealed text by using the concealed text and generate concealed text and concealed text of an integer portion e and a decimal fraction portion f ($0 \leq f < 1$) of the difference x−r from the concealed text;
      reconstruct the decimal fraction portion f from the concealed text;
      generate, from the decimal fraction portion f and the concealed text, concealed text of a left shift value y which is a value obtained by shifting $2^f$, which is 2 raised to a power f which is the decimal fraction portion f, to a left by e bit; and
      calculate, as the concealed text, concealed text of a value $2^r \times y$ obtained by multiplying the $2^r$ by the left shift value y from the concealed text by using the concealed text,
   wherein each of the two or more secure computation devices is configured to act upon a divided portion of the concealed text and such that each of the entire original text x, r, e, y, $2^r$ and $2^x$ is concealed from each of the secure computation devices.

2. A secure computation device in a secure computation system in which r is a random number which satisfies $0 \leq r < 1$, is concealed text of the random number r, and is concealed text of $2^r$, which is 2 raised to a power r, the secure computation system which comprises two or more secure computation devices and calculates, from concealed text of a value x which is a power to which 2 is raised, concealed text of $2^x$, which is 2 raised to the power x, the secure computation device comprising:
   processing circuitry configured, in cooperation with the other of the two or more secure computation devices, to:
      receive, over a network, an input of the concealed text;
      calculate concealed text of a difference x−r between the value x and the random number r from the concealed text by using the concealed text and generate concealed text and of an integer portion e and a decimal fraction portion f ($0 \leq f < 1$) of the difference x−r from the concealed text;

reconstruct the decimal fraction portion f from the concealed text;

generate, from the decimal fraction portion f and the concealed text, concealed text of a left shift value y which is a value obtained by shifting $2^f$, which is 2 raised to a power f which is the decimal fraction portion f, to a left by e bit; and calculate, as the concealed text, concealed text of a value $2^r \times y$ obtained by multiplying the $2^r$ by the left shift value y from the concealed text by using the concealed text, wherein each of the two or more secure computation devices is configured to act upon a divided portion of the concealed text and such that each of the entire original text x, r, e, y, $2^r$ and $2^x$ is concealed from each of the secure computation devices.

3. A secure computation method in which r is a random number which satisfies $0 \leq r < 1$, is concealed text of the random number r, and is concealed text of $2^r$, which is 2 raised to a power r, the secure computation method by which, from concealed text of a value x which is a power to which 2 is raised, concealed text of $2^x$, which is 2 raised to the power x, is calculated by using a secure computation system that comprises two or more secure computation devices, the secure computation method comprising:

the two or more secure computation devices cooperatively performing a receiving step of receiving, over a network, an input of the concealed text;

a decimal fraction decomposing step in which the secure computation system calculates concealed text of a difference x−r between the value x and the random number r from the concealed text by using the concealed text and generates concealed text and of an integer portion e and a decimal fraction portion f ($0 \leq f < 1$) of the difference x−r from the concealed text;

a reconstructing step in which the secure computation system reconstructs the decimal fraction portion f from the concealed text;

a left shift step in which the secure computation system generates, from the decimal fraction portion f and the concealed text, concealed text of a left shift value y which is a value obtained by shifting $2^f$, which is 2 raised to a power f which is the decimal fraction portion f, to a left by e bit; and a power calculating step in which the secure computation system calculates, as the concealed text, concealed text of a value $2^r \times y$ obtained by multiplying the $2^r$ by the left shift value y from the concealed text by using the concealed text wherein each of the two or more secure computation devices is configured to act upon a divided portion of the concealed text and such that each of the entire original text x, r, e, y, $2^r$ and $2^x$ is concealed from each of the secure computation devices.

4. A non-transitory computer readable medium that stores a program for causing a computer to function as a secure computation device in a secure computation system in which r is a random number which satisfies $0 \leq r < 1$, is concealed text of the random number r, and is concealed text of $2^r$, which is 2 raised to a power r, the secure computation system which comprises two or more secure computation devices and calculates, from concealed text of a value x which is a power to which 2 is raised, concealed text of $2^x$, which is 2 raised to the power x, the secure computation device comprising:

processing circuitry configured, in cooperation with the other of the two or more secure computation devices, to:

receive, over a network, an input of the concealed text;

calculate concealed text of a difference x−r between the value x and the random number r from the concealed text by using the concealed text and generate concealed text and of an integer portion e and a decimal fraction portion f ($0 \leq f < 1$) of the difference x−r from the concealed text;

reconstruct the decimal fraction portion f from the concealed text;

generate, from the decimal fraction portion f and the concealed text, concealed text of a left shift value y which is a value obtained by shifting $2^f$, which is 2 raised to a power f which is the decimal fraction portion f, to a left by e bit; and calculate, as the concealed text, concealed text of a value $2^r \times y$ obtained by multiplying the $2^r$ by the left shift value y from the concealed text by using the concealed text, wherein each of the two or more secure computation devices is configured to act upon a divided portion of the concealed text and such that each of the entire original text x, r, e, y, $2^r$ and $2^x$ is concealed from each of the secure computation devices.

\* \* \* \* \*

UNITED STATES PATENT AND TRADEMARK OFFICE
CERTIFICATE OF CORRECTION

PATENT NO. : 11,294,633 B2
APPLICATION NO. : 16/466887
DATED : April 5, 2022
INVENTOR(S) : Koki Hamada It is certified that error appears in the above-identified patent and that said Letters Patent is hereby corrected as shown below:

On the Title Page

Please replace Item (57) the Abstract which states:
"A secure computation system calculates concealed text of a difference x-r from concealed text by using concealed text and generates concealed text and of an integer portion e and a decimal fraction portion f ($0 \leq f < 1$) of the difference x-r from the concealed text; reconstructs the decimal fraction portion f from the concealed text; generates, from the decimal fraction portion f and the concealed text, concealed text of a left shift value y obtained by shifting $2^f$, which is 2 raised to the power f which is the decimal fraction portion f, to the left by e bit; and calculates, as concealed text, concealed text of a value $2^r \times y$ obtained by multiplying $2^r$, which is a power of 2, by the left shift value y from the concealed text by using the concealed text."
With:
--A secure computation system calculates concealed text [[x]]-[[r]] of a difference x-r from concealed text [[x]] by using concealed text [[r]] and generates concealed text [[e]] and [[f]] of an integer portion e and a decimal fraction portion f ($0 \leq f < 1$) of the difference x-r from the concealed text [[x]]-[[r]]; reconstructs the decimal fraction portion f from the concealed text [[f]]; generates, from the decimal fraction portion f and the concealed text [[e]], concealed text [[y]] of a left shift value y obtained by shifting $2^f$, which is 2 raised to the power f which is the decimal fraction portion f, to the left by e bit; and calculates, as concealed text [[$2^x$]], concealed text [[$2^r$]]×[[y]] of a value $2^r \times y$ obtained by multiplying $2^r$, which is a power of 2, by the left shift value y from the concealed text [[y]] by using the concealed text [[$2^r$]].--

In the Specification

Please replace the paragraph at Column 2, Line 17, which states:
"An aspect of the present invention is a secure computation system in which r is assumed Signed and Sealed this
Sixteenth Day of December, 2025

John A. Squires
*Director of the United States Patent and Trademark Office* to be a random number which satisfies $0 \leq r < 1$, is assumed to be concealed text of the random number r, and is assumed to be concealed text of $2^r$, which is 2 raised to the power r, the secure computation system which is configured with two or more secure computation devices and calculates, from concealed text of a value x which is the power to which 2 is raised, concealed text of $2^x$, which is 2 raised to the power x which is the value x. The secure computation system includes: a decimal fraction decomposing means that calculates concealed text of a difference x-r between the value x and the random number r from the concealed text by using the concealed text and generates concealed text and of an integer portion e and a decimal fraction portion f ($0 \leq f < 1$) of the difference x-r from the concealed text; a reconstructing means that reconstructs the decimal fraction portion f from the concealed text; a left shift means that generates, from the decimal fraction portion f and the concealed text, concealed text of a left shift value y which is a value obtained by shifting $2^f$, which is 2 raised to the power f which is the decimal fraction portion f, to the left by e bit; and a power calculating means that calculates, as the concealed text, concealed text of a value $2^r \times y$ obtained by multiplying the $2^r$, which is a power of 2, by the left shift value y from the concealed text by using the concealed text."

With:

--An aspect of the present invention is a secure computation system in which r is assumed to be a random number which satisfies $0 \leq r < 1$, [[r]] is assumed to be concealed text of the random number r, and [[$2^r$]] is assumed to be concealed text of $2^r$, which is 2 raised to the power r, the secure computation system which is configured with two or more secure computation devices and calculates, from concealed text [[x]] of a value x which is the power to which 2 is raised, concealed text [[$2^x$]] of $2^x$, which is 2 raised to the power x which is the value x. The secure computation system includes: a decimal fraction decomposing means that calculates concealed text [[x]]-[[r]] of a difference x-r between the value x and the random number r from the concealed text [[x]] by using the concealed text [[r]] and generates concealed text [[e]] and [[f]] of an integer portion e and a decimal fraction portion f ($0 \leq f < 1$) of the difference x-r from the concealed text [[x]]-[[r]]; a reconstructing means that reconstructs the decimal fraction portion f from the concealed text [[f]]; a left shift means that generates, from the decimal fraction portion f and the concealed text [[e]], concealed text [[y]] of a left shift value y which is a value obtained by shifting $2^f$, which is 2 raised to the power f which is the decimal fraction portion f, to the left by e bit; and a power calculating means that calculates, as the concealed text [[$2^x$]], concealed text [[$2^r$]]×[[y]] of a value $2^r \times y$ obtained by multiplying the $2^r$, which is a power of 2, by the left shift value y from the concealed text [[y]] by using the concealed text [[$2^r$]].--

Please replace the paragraph at Column 3, Line 16, which states:
"It is assumed that a value obtained by concealing a value a by encryption, secret sharing, or the like is referred to as concealed text of a and expressed as. It is assumed that, when the concealed text of a is generated by secret sharing, a set of shares of secret sharing, which the secure computation devices hold, is referred to based on."
With:

--It is assumed that a value obtained by concealing a value a by encryption, secret sharing, or the like is referred to as concealed text of a and expressed as [[a]]. It is assumed that, when the concealed text [[a]] of a is generated by secret sharing, a set of shares of secret sharing, which the secure computation devices hold, is referred to based on [[a]].--

Please replace the paragraph at Column 3, Line 23, which states:
"Moreover, it is assumed that processing by which a is obtained by reconstructing the concealed text of a is expressed as a ← Open."
With:
--Moreover, it is assumed that processing by which a is obtained by reconstructing the concealed text [[a]] of a is expressed as a ← Open([[a]]).--

Please replace the paragraph at Column 3, Line 41, which states:
"Addition, subtraction, and multiplication calculate concealed text and of a sum $c_1$, a difference $c_2$, and a product $c_3$, which are the calculation results of a+b, a-b, and ab, respectively, by using concealed text and of two values a and b as input. It is assumed that processing by which is obtained, processing by which is obtained, and processing by which is obtained are respectively expressed as ← Add ← Sub, and ← Mul. When there is no possibility of misunderstanding, Add, Sub, and Mulare sometimes abbreviated as +, -, and ×, respectively."
With:
--Addition, subtraction, and multiplication calculate concealed text [[$c_1$]], [[$c_2$]], and [[$c_3$]] of a sum $c_1$, a difference $c_2$, and a product $c_3$, which are the calculation results of a+b, a-b, and ab, respectively, by using concealed text [[a]] and [[b]] of two values a and b as input. It is assumed that processing by which [[$c_1$]] is obtained, processing by which [[$c_2$]] is obtained, and processing by which [[$c_3$]] is obtained are respectively expressed as [[$c_1$]] ← Add([[a]], [[b]]), [[$c_2$]] ← Sub([[a]], [[b]]), and [[$c_3$]] ← Mul([[a]], [[b]]). When there is no possibility of misunderstanding, Add([[a]], [[b]]), Sub([[a]], [[b]]), and Mul([[a]], [[b]]) are sometimes abbreviated as [[a]]+[[b]], [[a]]-[[b]], and [[a]]×[[b]], respectively.--

Please replace the paragraph at Column 3, Line 58, which states:
"It is assumed that processing by which, for concealed text of a, concealed text and of an integer portion e and a decimal fraction portion f ($0 \leq f < 1$) of a is calculated is expressed as ← Split."
With:
--It is assumed that processing by which, for concealed text [[a]] of a, concealed text [[e]] and [[f]] of an integer portion e and a decimal fraction portion f ($0 \leq f < 1$) of a is calculated is expressed as [[e]], [[f]] ← Split([[a]]).--

Please replace the paragraph at Column 4, Line 5, which states:
"It is assumed that processing by which concealed text of a left shift value c (= $a \times 2^b$), which is a value obtained by shifting a to the left by b bit (that is, a value obtained by multiplying a by $2^b$), is calculated from concealed text of a and concealed text of b is expressed as ←<<."
With:
--It is assumed that processing by which concealed text [[c]] of a left shift value c (= a×$2^b$), which is a value obtained by shifting a to the left by b bit (that is, a value obtained by multiplying a by $2^b$), is calculated from concealed text [[a]] of a and concealed text [[b]] of b is expressed as [[c]] ← [[a]] << [[b]].--

Please replace the paragraph at Column 4, Line 27, which states:
"Input is concealed text of a value x which is the power to which 2 is raised. Moreover, concealed text and of a random number r, which satisfies $0 \leq r < 1$, and $2^r$, which is 2 raised to the power r, is also input."
With:
--Input is concealed text [[x]] of a value x which is the power to which 2 is raised. Moreover, concealed text [[r]] and [[$2^r$]] of a random number r, which satisfies $0 \leq r < 1$, and $2^r$, which is 2 raised to the power r, is also input.--

Please replace the paragraph at Column 4, Line 31, which states:
"Output is concealed text of $2^x$, which is 2 raised to the power x."
With:
--Output is concealed text [[$2^x$]] of $2^x$, which is 2 raised to the power x.--

Please replace the paragraph at Column 4, Line 38, which states:
"In Step 1, from the input concealed text and, concealed text of a difference x-r, which is the result of subtraction of the random number r from x, is calculated. Next, concealed text and of an integer portion e and a decimal fraction portion f ($0 \leq f < 1$) of the difference x-r is generated from the concealed text. Here, x-r = e+f holds."
With:
--In Step 1, from the input concealed text [[x]] and [[r]], concealed text [[x]]-[[r]] of a difference x-r, which is the result of subtraction of the random number r from x, is calculated. Next, concealed text [[e]] and [[f]] of an integer portion e and a decimal fraction portion f ($0 \leq f < 1$) of the difference x-r is generated from the concealed text [[x]]-[[r]]. Here, x-r = e+f holds.--

Please replace the paragraph at Column 4, Line 44, which states:
"In Step 2, the decimal fraction portion f of the difference x-r is reconstructed from the concealed text generated in Step 1."
With:
--In Step 2, the decimal fraction portion f of the difference x-r is reconstructed from the concealed text [[f]] generated in Step 1.--

Please replace the paragraph at Column 4, Line 47, which states:
"In Step 3, concealed text of a left shift value y which is a value obtained by shifting $2^f$, which is 2 raised to the power f, to the left by e bit is generated from the decimal fraction portion f reconstructed in Step 2 and the concealed text generated in Step 1. Here, $y = 2^f \ll e = 2^{f+e} = 2^{x-r}$ holds."
With:
--In Step 3, concealed text [[y]] of a left shift value y which is a value obtained by shifting $2^f$, which is 2 raised to the power f, to the left by e bit is generated from the decimal fraction portion f reconstructed in Step 2 and the concealed text [[e]] generated in Step 1. Here, $y = 2^f \ll e = 2^{f+e} = 2^{x-r}$ holds.--

Please replace the paragraph at Column 4, Line 52, which states:
"In Step 4, concealed text of the product $2^r \times y$, which is the result of multiplication of $2^r$ by y, is calculated from the input concealed text and the concealed text generated in Step 3. Here, $2^r \times y = 2^r \times 2^{x-r} = 2^x$ holds."
With:
--In Step 4, concealed text $[[2^r]] \times [[y]]$ of the product $2^r \times y$, which is the result of multiplication of $2^r$ by y, is calculated from the input concealed text $[[2^r]]$ and the concealed text [[y]] generated in Step 3. Here, $2^r \times y = 2^r \times 2^{x-r} = 2^x$ holds.--

Please replace the paragraph at Column 5, Line 42, which states:
"By using concealed text and of the previously generated random number r ($0 \leq r < 1$) and $2^r$, which is 2 raised to the power r, the secure computation system 10 calculates, from concealed text of a value (that is, an exponent) x which is the power to which 2 is raised, concealed text of $2^x$, which is 2 raised to the power x. Hereinafter, an operation of the secure computation system 10 will be described in accordance with Fig. 4."
With:
--By using concealed text [[r]] and $[[2^r]]$ of the previously generated random number r ($0 \leq r < 1$) and $2^r$, which is 2 raised to the power r, the secure computation system 10 calculates, from concealed text [[x]] of a value (that is, an exponent) x which is the power to which 2 is raised, concealed text $[[2^x]]$ of $2^x$, which is 2 raised to the power x. Hereinafter, an operation of the secure computation system 10 will be described in accordance with Fig. 4.--

Please replace the paragraph at Column 5, Line 50, which states:
"The random number generating means 110 generates a random number r which satisfies $0 \leq r < 1$ and generates concealed text and (S110). This corresponds to a preliminary setup of input values of the secure computation algorithm of Fig. 1. The concealed text and is recorded on the recording units $190_1$, ..., $190_W$."
With:
--The random number generating means 110 generates a random number r which satisfies $0 \leq r < 1$ and generates concealed text [[r]] and $[[2^r]]$ (S110). This corresponds to a preliminary setup of input values of the secure computation algorithm of Fig. 1. The concealed text [[r]] and $[[2^r]]$ is recorded on the recording units $190_1$, ..., $190_W$.--

Please replace the paragraph at Column 5, Line 56, which states:
"By using the concealed text generated before input of the concealed text, the decimal

CERTIFICATE OF CORRECTION (continued)
U.S. Pat. No. 11,294,633 B2 fraction decomposing means 120 calculates concealed text of a difference x-r between x and the random number r from the concealed text of x and generates concealed text and of an integer portion e and a decimal fraction portion f ($0 \leq f < 1$) of the difference x-r from the concealed text (S120). This corresponds to Step 1 of the secure computation algorithm of Fig. 1."

With:

--By using the concealed text [[r]] generated before input of the concealed text [[x]], the decimal fraction decomposing means 120 calculates concealed text [[x]]-[[r]] of a difference x-r between x and the random number r from the concealed text [[x]] of x and generates concealed text [[e]] and [[f]] of an integer portion e and a decimal fraction portion f ($0 \leq f < 1$) of the difference x-r from the concealed text [[x]]-[[r]] (S120). This corresponds to Step 1 of the secure computation algorithm of Fig. 1.--

Please replace the paragraph at Column 5, Line 64, which states:
"The reconstructing means 130 reconstructs the decimal fraction portion f from the concealed text generated in S120 (S130). This corresponds to Step 2 of the secure computation algorithm of Fig. 1."

With:

--The reconstructing means 130 reconstructs the decimal fraction portion f from the concealed text [[f]] generated in S120 (S130). This corresponds to Step 2 of the secure computation algorithm of Fig. 1.--

Please replace the paragraph at Column 6, Line 1, which states:
"The left shift means 140 generates, from the decimal fraction portion f reconstructed in S130 and the concealed text generated in S120, concealed text = $2^f$ << of a left shift value y which is a value obtained by shifting $2^f$, which is 2 raised to the power f which is the decimal fraction portion f, to the left by e bit (S140). This corresponds to Step 3 of the secure computation algorithm of Fig. 1."

With:

--The left shift means 140 generates, from the decimal fraction portion f reconstructed in S130 and the concealed text [[e]] generated in S120, concealed text [[y]] = $2^f$ << [[e]] of a left shift value y which is a value obtained by shifting $2^f$, which is 2 raised to the power f which is the decimal fraction portion f, to the left by e bit (S140). This corresponds to Step 3 of the secure computation algorithm of Fig. 1.--

Please replace the paragraph at Column 6, Line 8, which states:
"By using the concealed text generated before input of the concealed text, the power calculating means 150 calculates, from the concealed text generated in S140, concealed text of the product $2^r \times y$ which is the result of multiplication of $2^r$, which is a power of 2, by the left shift value y (S150). This corresponds to Step 4 of the secure computation algorithm of Fig. 1."

With:

--By using the concealed text [[$2^r$]] generated before input of the concealed text [[x]], the power calculating means 150 calculates, from the concealed text [[y]] generated in S140, concealed text [[$2^r$]]×[[y]] of the product $2^r \times y$ which is the result of multiplication of $2^r$, which is a power of 2, by the left shift value y (S150). This corresponds to Step 4 of the secure computation algorithm of Fig. 1.--

Please replace the paragraph at Column 6, Line 15, which states:
"According to the invention of the present embodiment, since calculation of $2^x$ can be implemented by executing one subtraction, one decimal fraction decomposition operation, one reconstruction operation, one left shift operation, and one multiplication, calculation cost is reduced. Moreover, by using the fact that $2^x = 2^{x-r} \times 2^r$ on the assumption that is given, processing by which the output value is calculated from the input value is reduced to calculation of. In general, information leaks when the decimal fraction portion f of the exponent x-r of $2^{x-r}$ is reconstructed; however, by adjusting the decimal fraction portion of the exponent x-r so as to be uniform random values greater than or equal to 0 and smaller than 1 (that is, by extracting a decimal fraction portion after calculating x-r and making only the decimal fraction portion public), it is possible to securely execute calculation of $2^x$."
With:
--According to the invention of the present embodiment, since calculation of $2^x$ can be implemented by executing one subtraction, one decimal fraction decomposition operation, one reconstruction operation, one left shift operation, and one multiplication, calculation cost is reduced. Moreover, by using the fact that $2^x = 2^{x-r} \times 2^r$ on the assumption that [[$2^r$]] is given, processing by which the output value [[$2^x$]] is calculated from the input value [[x]] is reduced to calculation of [[$2^{x-r}$]]. In general, information leaks when the decimal fraction portion f of the exponent x-r of $2^{x-r}$ is reconstructed; however, by adjusting the decimal fraction portion of the exponent x-r so as to be uniform random values greater than or equal to 0 and smaller than 1 (that is, by extracting a decimal fraction portion after calculating x-r and making only the decimal fraction portion public), it is possible to securely execute calculation of $2^x$.--

In the Claims

Please replace Claim 1 at Column 8, Line 18, which states:
"1. A secure computation system in which r is a random number which satisfies $0 \leq r < 1$, is concealed text of the random number r, and is concealed text of $2^r$, which is 2 raised to a power r, the secure computation system which comprises two or more secure computation devices and calculates, from concealed text of a value x which is a power to which 2 is raised, concealed text of $2^x$, which is 2 raised to the power x ~~x~~, the secure computation system comprising:

the two or more secure computation devices which each have processing circuitry and are configured to cooperatively:

receive, over a network, an input of the concealed text;

calculate concealed text of a difference x-r between the value x and the random number r from the concealed text by using the concealed text and generate concealed text and concealed text of an integer portion e and a decimal fraction portion f ($0 \leq f < 1$) of the difference x-r from the concealed text;

reconstruct the decimal fraction portion f from the concealed text;

generate, from the decimal fraction portion f and the concealed text, concealed text of a left shift value y which is a value obtained by shifting $2^f$, which is 2 raised to a power f which is the decimal fraction portion f, to a left by e bit; and calculate, as the concealed text, concealed text of a value $2^r \times y$ obtained by multiplying the $2^r$ by the left shift value y from the concealed text by using the concealed text, wherein each of the two or more secure computation devices is configured to act upon a divided portion of the concealed text such that each of the entire original text x, r, e, y, $2^r$ and $2^x$ is concealed from each of the secure computation devices."

With:

--1. A secure computation system in which r is a random number which satisfies $0 \leq r < 1$, [[r]] is concealed text of the random number r, and [[$2^r$]] is concealed text of $2^r$, which is 2 raised to a power r, the secure computation system which comprises two or more secure computation devices and calculates, from concealed text [[x]] of a value x which is a power to which 2 is raised, concealed text [[$2^x$]] of $2^x$, which is 2 raised to the power x x, the secure computation system comprising:

the two or more secure computation devices which each have processing circuitry and are configured to cooperatively:

receive, over a network, an input of the concealed text [[x]];

calculate concealed text [[x]]-[[r]] of a difference x-r between the value x and the random number r from the concealed text [[x]] by using the concealed text [[r]] and generate concealed text [[e]] and concealed text [[f]] of an integer portion e and a decimal fraction portion f ($0 \leq f < 1$) of the difference x-r from the concealed text [[x]]-[[r]];

reconstruct the decimal fraction portion f from the concealed text [[f]];

generate, from the decimal fraction portion f and the concealed text [[e]], concealed text [[y]] of a left shift value y which is a value obtained by shifting $2^f$, which is 2 raised to a power f which is the decimal fraction portion f, to a left by e bit; and calculate, as the concealed text [[$2^x$]], concealed text [[$2^r$]]×[[y]] of a value $2^r \times y$ obtained by multiplying the $2^r$ by the left shift value y from the concealed text [[y]] by using the concealed text [[$2^r$]], wherein each of the two or more secure computation devices is configured to act upon a divided portion of the concealed text [[x]], [[r]], [[e]], [[y]], [[$2^r$]] and [[$2^x$]] such that each of the entire original text x, r, e, y, $2^r$ and $2^x$ is concealed from each of the secure computation devices.--

Please replace Claim 2 at Column 8, Line 52, which states:

"2. A secure computation device in a secure computation system in which r is a random number which satisfies $0 \leq r < 1$, is concealed text of the random number r, and is concealed text of $2^r$, which is 2 raised to a power r, the secure computation system which comprises two or more secure computation devices and calculates, from concealed text of a

CERTIFICATE OF CORRECTION (continued)
U.S. Pat. No. 11,294,633 B2 value x which is a power to which 2 is raised, concealed text of $2^x$, which is 2 raised to the power x, the secure computation device comprising:
    processing circuitry configured, in cooperation with the other of the two or more secure computation devices, to:
        receive, over a network, an input of the concealed text;
        calculate concealed text of a difference x-r between the value x and the random number r from the concealed text by using the concealed text and generate concealed text and of an integer portion e and a decimal fraction portion f ($0 < f < 1$) of the difference x-r from the concealed text;
        reconstruct the decimal fraction portion f from the concealed text;
        generate, from the decimal fraction portion f and the concealed text, concealed text of a left shift value y which is a value obtained by shifting $2^f$, which is 2 raised to a power f which is the decimal fraction portion f, to a left by e bit; and
        calculate, as the concealed text, concealed text of a value $2^r \times y$ obtained by multiplying the $2^r$ by the left shift value y from the concealed text by using the concealed text,
        wherein each of the two or more secure computation devices is configured to act upon a divided portion of the concealed text such that each of the entire original text x, r, e, y, $2^r$ and $2^x$ is concealed from each of the secure computation devices."

With:

--2. A secure computation device in a secure computation system in which r is a random number which satisfies $0 \leq r < 1$, [[r]] is concealed text of the random number r, and [[$2^r$]] is concealed text of $2^r$, which is 2 raised to a power r, the secure computation system which comprises two or more secure computation devices and calculates, from concealed text [[x]] of a value x which is a power to which 2 is raised, concealed text [[$2^x$]] of $2^x$, which is 2 raised to the power x, the secure computation device comprising:
    processing circuitry configured, in cooperation with the other of the two or more secure computation devices, to:
        receive, over a network, an input of the concealed text [[x]];
        calculate concealed text [[x]]-[[r]] of a difference x-r between the value x and the random number r from the concealed text [[x]] by using the concealed text [[r]] and generate concealed text [[e]] and [[f]] of an integer portion e and a decimal fraction portion f ($0 \leq f < 1$) of the difference x-r from the concealed text [[x]]-[[r]];
        reconstruct the decimal fraction portion f from the concealed text [[f]];
        generate, from the decimal fraction portion f and the concealed text [[e]], concealed text [[y]] of a left shift value y which is a value obtained by shifting $2^f$, which is 2 raised to a power f which is the decimal fraction portion f, to a left by e bit; and
        calculate, as the concealed text [[$2^x$]], concealed text [[$2^r$]]×[[y]] of a value $2^r \times y$ obtained by multiplying the $2^r$ by the left shift value y from the concealed text [[y]] by using the concealed text [[$2^r$]],
        wherein each of the two or more secure computation devices is configured to act upon a divided portion of the concealed text [[x]], [[r]], [[e]], [[y]], [[$2^r$]] and [[$2^x$]] such

CERTIFICATE OF CORRECTION (continued)
U.S. Pat. No. 11,294,633 B2 that each of the entire original text x, r, e, y, $2^r$ and $2^x$ is concealed from each of the secure computation devices.--

Please replace Claim 3 at Column 9, Line 20, which states:
"3. A secure computation method in which r is a random number which satisfies $0 \leq r < 1$, is concealed text of the random number r, and is concealed text of $2^r$, which is 2 raised to a power r, the secure computation method by which, from concealed text of a value x which is a power to which 2 is raised, concealed text of $2^x$, which is 2 raised to the power x, is calculated by using a secure computation system that comprises two or more secure computation devices, the secure computation method comprising:

the two or more secure computation devices cooperatively performing a receiving step of receiving, over a network, an input of the concealed text;

a decimal fraction decomposing step in which the secure computation system calculates concealed text of a difference x-r between the value x and the random number r from the concealed text by using the concealed text and generates concealed text and of an integer portion e and a decimal fraction portion f ($0 \leq f < 1$) of the difference x-r from the concealed text;

a reconstructing step in which the secure computation system reconstructs the decimal fraction portion f from the concealed text;

a left shift step in which the secure computation system generates, from the decimal fraction portion f and the concealed text, concealed text of a left shift value y which is a value obtained by shifting $2^f$, which is 2 raised to a power f which is the decimal fraction portion f, to a left by e bit; and a power calculating step in which the secure computation system calculates, as the concealed text, concealed text of a value $2^r \times y$ obtained by multiplying the $2^r$-by the left shift value y from the concealed text by using the concealed text.

wherein each of the two or more secure computation devices is configured to act upon a divided portion of the concealed text such that each of the entire original text x, r, e, y, $2^r$ and $2^x$ is concealed from each of the secure computation devices."

With:
--3. A secure computation method in which r is a random number which satisfies $0 \leq r < 1$, [[r]] is concealed text of the random number r, and [[$2^r$]] is concealed text of $2^r$, which is 2 raised to a power r, the secure computation method by which, from concealed text [[x]] of a value x which is a power to which 2 is raised, concealed text [[$2^x$]] of $2^x$, which is 2 raised to the power x, is calculated by using a secure computation system that comprises two or more secure computation devices, the secure computation method comprising:

the two or more secure computation devices cooperatively performing a receiving step of receiving, over a network, an input of the concealed text [[x]];

a decimal fraction decomposing step in which the secure computation system calculates concealed text [[x]]-[[r]] of a difference x-r between the value x and the random number r from the concealed text [[x]] by using the concealed text [[r]] and generates concealed text [[e]] and [[f]] of an integer portion e and a decimal fraction portion f ($0 \leq f < 1$) of the difference x-r from the concealed text [[x]]-[[r]];

a reconstructing step in which the secure computation system reconstructs the decimal fraction portion f from the concealed text [[f]];

a left shift step in which the secure computation system generates, from the decimal fraction portion f and the concealed text [[e]], concealed text [[y]] of a left shift value y which is a value obtained by shifting $2^f$, which is 2 raised to a power f which is the decimal fraction portion f, to a left by e bit; and a power calculating step in which the secure computation system calculates, as the concealed text [[$2^x$]], concealed text [[$2^r$]]×[[y]] of a value $2^r$×y obtained by multiplying the $2^r$-by the left shift value y from the concealed text [[y]] by using the concealed text [[$2^r$]].

wherein each of the two or more secure computation devices is configured to act upon a divided portion of the concealed text [[x]], [[r]], [[e]], [[y]], [[$2^r$]] and [[$2^x$]] such that each of the entire original text x, r, e, y, $2^r$ and $2^x$ is concealed from each of the secure computation devices.--

Please replace Claim 4 at Column 8, Line 52, which states:
"4. A non-transitory computer readable medium that stores a program for causing a computer to function as a secure computation device in a secure computation system in which r is a random number which satisfies $0 \leq r < 1$, is concealed text of the random number r, and is concealed text of $2^r$, which is 2 raised to a power r, the secure computation system which comprises two or more secure computation devices and calculates, from concealed text of a value x which is a power to which 2 is raised, concealed text of $2^x$, which is 2 raised to the power x, the secure computation device comprising:

processing circuitry configured, in cooperation with the other of the two or more secure computation devices, to:

receive, over a network, an input of the concealed text;

calculate concealed text of a difference x-r between the value x and the random number r from the concealed text by using the concealed text and generate concealed text and of an integer portion e and a decimal fraction portion f ($0 \leq f < 1$) of the difference x-r from the concealed text;

reconstruct the decimal fraction portion f from the concealed text;

generate, from the decimal fraction portion f and the concealed text, concealed text of a left shift value y which is a value obtained by shifting $2^f$, which is 2 raised to a power f which is the decimal fraction portion f, to a left by e bit; and calculate, as the concealed text, concealed text of a value $2^r$×y obtained by multiplying the $2^r$ by the left shift value y from the concealed text by using the concealed text, wherein each of the two or more secure computation devices is configured to act upon a divided portion of the concealed text such that each of the entire original text x, r, e, y, $2^r$ and $2^x$ is concealed from each of the secure computation devices."
With:
--4. A non-transitory computer readable medium that stores a program for causing a computer to function as a secure computation device in a secure computation system in which r is a random number which satisfies $0 \leq r < 1$, [[r]] is concealed text of the random number r, and $[[2^r]]$ is concealed text of $2^r$, which is 2 raised to a power r, the secure computation system which comprises two or more secure computation devices and calculates, from concealed text $[[x]]$ of a value x which is a power to which 2 is raised, concealed text $[[2^x]]$ of $2^x$, which is 2 raised to the power x, the secure computation device comprising:

processing circuitry configured, in cooperation with the other of the two or more secure computation devices, to:

receive, over a network, an input of the concealed text $[[x]]$;

calculate concealed text $[[x]]-[[r]]$ of a difference x-r between the value x and the random number r from the concealed text $[[x]]$ by using the concealed text $[[r]]$ and generate concealed text $[[e]]$ and $[[f]]$ of an integer portion e and a decimal fraction portion f ($0 \leq f < 1$) of the difference x-r from the concealed text $[[x]]-[[r]]$;

reconstruct the decimal fraction portion f from the concealed text $[[f]]$;

generate, from the decimal fraction portion f and the concealed text $[[e]]$, concealed text $[[y]]$ of a left shift value y which is a value obtained by shifting $2^f$, which is 2 raised to a power f which is the decimal fraction portion f, to a left by e bit; and calculate, as the concealed text $[[2^x]]$, concealed text $[[2^r]] \times [[y]]$ of a value $2^r \times y$ obtained by multiplying the $2^r$ by the left shift value y from the concealed text $[[y]]$ by using the concealed text $[[2^r]]$, wherein each of the two or more secure computation devices is configured to act upon a divided portion of the concealed text $[[x]]$, $[[r]]$, $[[e]]$, $[[y]]$, $[[2^r]]$ and $[[2^x]]$ such that each of the entire original text x, r, e, y, $2^r$ and $2^x$ is concealed from each of the secure computation devices.--